(12) United States Patent
Teng

(10) Patent No.: US 11,173,856 B2
(45) Date of Patent: Nov. 16, 2021

(54) BACKUP DEVICE FOR VEHICLE

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventor: Hao Teng, Mie (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 305 days.

(21) Appl. No.: 16/336,286

(22) PCT Filed: Sep. 12, 2017

(86) PCT No.: PCT/JP2017/032892
§ 371 (c)(1),
(2) Date: Mar. 25, 2019

(87) PCT Pub. No.: WO2018/061750
PCT Pub. Date: Apr. 5, 2018

(65) Prior Publication Data
US 2019/0232902 A1 Aug. 1, 2019

(30) Foreign Application Priority Data

Sep. 30, 2016 (JP) .............................. JP2016-193656

(51) Int. Cl.
*B60R 16/033* (2006.01)
*B60T 1/06* (2006.01)
(Continued)

(52) U.S. Cl.
CPC ............ *B60R 16/033* (2013.01); *B60T 1/065* (2013.01); *B60T 13/741* (2013.01); *B60T 17/18* (2013.01);
(Continued)

(58) Field of Classification Search
CPC ..... B60R 16/033; B60T 1/065; B60T 13/741; B60T 17/18; B60T 17/22;
(Continued)

(56) References Cited

U.S. PATENT DOCUMENTS

2004/0009756 A1\* 1/2004 Kuranuki ................ H02J 9/005
455/127.1
2010/0004793 A1\* 1/2010 Ohkuwa ................... H02J 1/14
700/295
(Continued)

FOREIGN PATENT DOCUMENTS

JP 2000-312444 A 11/2000
JP 2010-234855 A 10/2010
(Continued)

OTHER PUBLICATIONS

International Search Report, Application No. PCT/JP2017/032892, dated Dec. 19, 2017.

*Primary Examiner* — Peter D Nolan
*Assistant Examiner* — Ce Li Li
(74) *Attorney, Agent, or Firm* — Honigman LLP

(57) ABSTRACT

A backup device for a vehicle performs backup of a plurality of drive sources based on power supply from a second power supply unit even when power supply from a first power supply unit stops and reduces the peak voltage necessary in the backup operation. In a backup device, when an abnormal state of the power supply from a first power supply unit is detected, a control unit instructs a discharge unit to intermittently apply a discharge current a plurality of times to
(Continued)

each of a plurality of motors and controls a supply destination of the discharge current such that each instruction time period during which the discharge unit is instructed to apply the discharge current to one motor is shifted with respect to each instruction time period during which the discharge unit is instructed to apply the discharge current to the other motor.

1 Claim, 6 Drawing Sheets

(51) Int. Cl.
*B60T 13/74* (2006.01)
*B60T 17/22* (2006.01)
*H02J 7/00* (2006.01)
*H02J 9/06* (2006.01)
*B60T 17/18* (2006.01)
*H02J 7/34* (2006.01)
*H02J 1/10* (2006.01)

(52) U.S. Cl.
CPC ................ *B60T 17/22* (2013.01); *H02J 1/10* (2013.01); *H02J 7/0063* (2013.01); *H02J 7/34* (2013.01); *H02J 9/06* (2013.01); *B60T 2270/402* (2013.01); *H02J 2007/0067* (2013.01)

(58) Field of Classification Search
CPC ....... B60T 2270/402; H02J 1/082; H02J 1/10; H02J 2007/0067; H02J 2310/46; H02J 2310/48; H02J 7/00; H02J 7/0029; H02J 7/0063; H02J 7/00712; H02J 7/14; H02J 7/1446; H02J 7/34; H02J 7/345; H02J 9/06; H02J 9/061; Y02T 10/92
See application file for complete search history.

(56) References Cited

U.S. PATENT DOCUMENTS

2011/0198924 A1* 8/2011 Yamaki ............... H02M 1/4266
 307/31
2012/0112696 A1* 5/2012 Ikeda .................. B60L 11/1844
 320/109
2017/0182984 A1 6/2017 Masuda

FOREIGN PATENT DOCUMENTS

JP 2010-241271 A 10/2010
JP 2015-020668 A 2/2015
JP 2015-042090 A 3/2015

* cited by examiner

BACKUP DEVICE FOR VEHICLE

CROSS-REFERENCE TO RELATED APPLICATIONS

This application is the U.S. national stage of PCT/JP2017/032892 filed Sep. 12, 2017, which claims priority of Japanese Patent Application No. JP 2016-193656 filed Sep. 30, 2016, the contents of which are incorporated herein.

TECHNICAL FIELD

The present disclosure is related to a backup device for a vehicle.

BACKGROUND

In recent years, the number of vehicles having an electronic control system, such as an electric parking brake (EPB) system, mounted thereon is on the increase. In vehicles of such a type, there is a risk that if a main power source fails and power supply therefrom stops, the operation of the system may no longer be possible. Therefore, it is required to perform a backup operation in some way.

As a technique for performing backup of an EPB system by using an auxiliary power source when the main power source fails, a technique such as that disclosed in JP 2015-20668A, for example, has been proposed. JP 2015-20668A discloses a vehicle control device that is configured as a device that supplies power to an EPB ECU and an electric parking brake device by causing a power storage unit serving as the auxiliary power source to discharge when a failure of a battery that is the main power source occurs.

In a system that performs a backup operation by using a power storage unit upon failure of the main power source, it is necessary to determine the capacity of the power storage unit used for backup in accordance with the current consumption expected during backup. For example, an EPB system needs to concurrently drive left and right motors with large current consumption during a parking operation, and thus requires much power during backup. Accordingly, when envisioning backup of such a system, there is a problem in that the scale of the power storage unit needs to be increased, which incurs an increase in device size and cost.

The present disclosure has been made based on the above-described situations and aims to realize a backup device for a vehicle, which is capable of performing backup of a plurality of drive sources based on power supply from a second power supply unit even when power supply from a first power supply unit stops, and is capable of effectively reducing the peak current that is needed during the backup operation.

SUMMARY

The present disclosure is a backup device for a vehicle, the backup device controlling a second power supply unit in a power supply system for a vehicle, the power supply system including a first power supply unit and the second power supply unit, which supplies power at least when power supply from the first power supply unit stops, the backup device including: a discharge unit for performing a discharge operation of applying a discharge current at least to a plurality of predetermined drive sources based on the power supplied from the second power supply unit; an abnormality detection unit for detecting an abnormal state in which the power supply from the first power supply unit has entered a predetermined decreased state; and a control unit for, when a predetermined starting condition is satisfied in a case in which the abnormality detection unit has detected the abnormal state, instructing the discharge unit to intermittently apply the discharge current a plurality of times to each of the plurality of drive sources, and controlling a supply destination of the discharge current such that each instruction time period during which the discharge unit is instructed to apply the discharge current to each of the drive sources is shifted with respect to each instruction time period during which the discharge unit is instructed to apply the discharge current to another drive source.

Advantageous Effects of Disclosure

In this backup device, when the abnormality detection unit detects the abnormal state, the control unit provides an instruction (an instruction to intermittently apply the discharge current a plurality of times to each of the plurality of drive sources) to the discharge unit. Due to this, it is possible to cause the second power supply unit to discharge and apply the discharge current to the plurality of predetermined drive sources by using the discharge unit. Furthermore, the control unit controls a supply destination of the discharge current such that each instruction time period during which the discharge unit is instructed to apply the discharge current to each of the plurality of drive sources is shifted with respect to each instruction time period during which the discharge unit is instructed to apply the discharge current to another drive source. Due to this, the time periods during which the discharge current flows intermittently in each of the plurality of drive sources will be shifted from the time periods during which the discharge current flows intermittently in another drive source. Accordingly, the concurrent concentration of discharge currents in the plurality of drive sources can be moderated and the peak level of the current output from the second power supply unit can be suppressed.

Hence, the above-described backup device is capable of performing backup of a plurality of drive sources based on the power supply from the second power supply unit even when the power supply from the first power supply unit stops, and is capable of effectively reducing the peak current that is needed during the backup operation. Due to this, it is easier to reduce the scale of the second power supply unit, and the size and cost of the second power supply unit can be reduced.

DETAILED DESCRIPTION OF PREFERRED EMBODIMENTS

Figure 1:
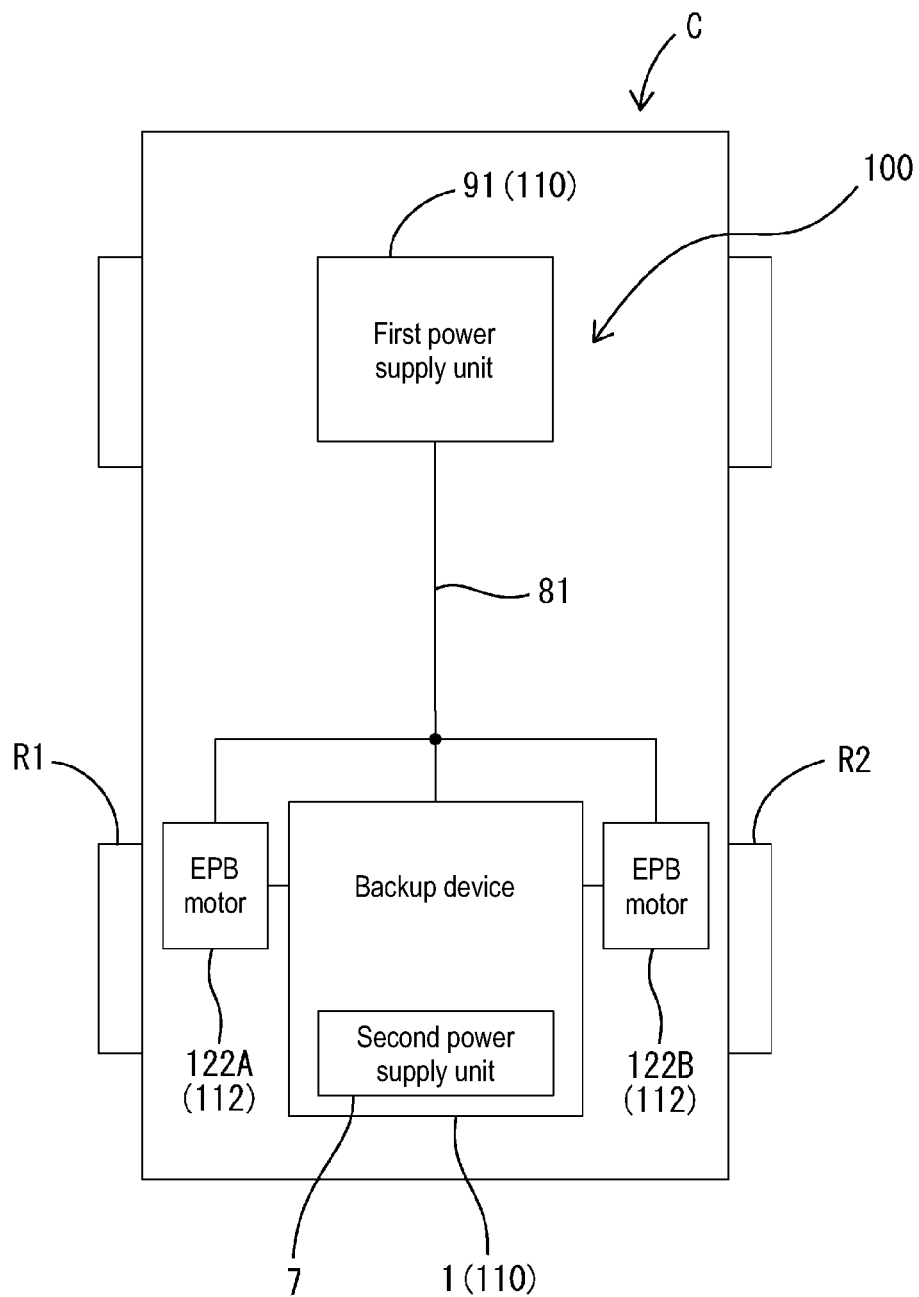
FIG. 1 is an explanatory diagram conceptually illustrating a vehicle including a backup device for a vehicle, which pertains to Embodiment 1.

The following describes desirable examples of the present disclosure. However, the present disclosure is not limited to the following examples.

A control unit may function such that, when a predetermined starting condition is satisfied in a case in which an abnormality detection unit has detected an abnormal state, the control unit instructs the discharge unit to intermittently apply a discharge current a plurality of times to each of a plurality of drive sources, and the control unit controls a supply destination of the discharge current such that each instruction time period during which the discharge unit is instructed to apply the discharge current to each of the plurality of drive sources does not overlap with each instruction time period during which the discharge unit is instructed to apply the discharge current to another drive source.

In the backup device forming the above-described configuration, the supply destination of the discharge current is controlled such that each instruction time period during which the discharge unit is instructed to apply the discharge current to each of the plurality of drive sources do not overlap with each instruction time period during which the discharge unit is instructed to apply the discharge current to another drive source, whereby concurrent concentration of discharge currents in the plurality of drive sources can be more reliably suppressed and the peak current that is needed during the backup operation can be reduced more effectively.

The control unit may function such that, when a predetermined starting condition is satisfied in a case in which the abnormality detection unit has detected the abnormal state, the control unit instructs the discharge unit to intermittently apply the discharge current a plurality of times to each of the plurality of drive sources and sets a stop time period during which the discharge unit is instructed not to apply the discharge current to any drive source between each instruction time period during which the discharge unit is instructed to apply the discharge current to each of the plurality of drive sources and each instruction time period during which the discharge unit is subsequently instructed to apply the discharge current to another drive source.

In the backup device forming the above-described configuration, a stop time period during which the discharge unit is instructed not to apply the discharge current to any drive source is set between each instruction time period during which the discharge unit is instructed to apply the discharge current to each of the plurality of drive sources and each instruction time period during which the discharge unit is subsequently instructed to apply the discharge current to another drive source, and thereby a situation in which discharge currents obtained based on the power supply from the second power supply unit flow concurrently in the plurality of predetermined drive sources can be more reliably suppressed or prevented.

The backup target of the backup device of the present disclosure may be an electric parking brake that includes, as the plurality of drive sources, two motors for driving friction members provided in correspondence with wheels at both sides of the vehicle in a width direction and operates such that, during positive rotation driving of the motors in a predetermined positive direction, the friction members corresponding to the motors move toward and come into contact with friction-receiving members integrally provided in the wheels to generate a braking force, and during reverse rotation driving of the motors in a reverse direction opposite to the positive direction, the friction members corresponding to the motors move away from the friction-receiving members to release the braking force. In this case, the control unit may function such that when a predetermined starting condition is satisfied in a case in which the abnormality detection unit has detected the abnormal state, the control unit instructs the discharge unit to intermittently apply the discharge current a plurality of times to each of the two motors and controls a supply destination of the discharge current such that each instruction time period during which the discharge unit is instructed to apply the discharge current to one of the motors is shifted with respect to each instruction time period during which the discharge unit is instructed to apply the discharge current to the other one of the motors.

In the above-described backup device, when the power supply from the first power supply unit enters the abnormal state, the control unit provides an instruction (an instruction to intermittently apply the discharge current a plurality of times to each of the two motors) to the discharge unit. Due to this, it is possible to cause the second power supply unit to discharge and cause the two motors to operate by using the discharge unit, whereby the electric parking brake can be driven. Furthermore, the control unit controls a supply destination of the discharge current such that each instruction time period during which the discharge unit is instructed to apply the discharge current to one of the motors is shifted with respect to each instruction time period during which the discharge unit is instructed to apply the discharge current to the other one of the motors. Due to this, the time periods during which the discharge current flows intermittently in one of the motors will be shifted from the time periods during which the discharge current flows intermittently in the other motor. Accordingly, the concurrent concentration of discharge currents in the two motors can be moderated and the peak level of the current output from the second power supply unit can be suppressed. Furthermore, instead of causing the motor at one side to operate after the operation of the motor on the other side is completed, the discharge current will be supplied intermittently to both motors over a certain period. Due to this, a bias in the drive timings of the two motors can be suppressed.

Embodiment 1

The following describes Embodiment 1 for implementing the present disclosure.

FIG. 1 is an explanatory diagram conceptually illustrating a vehicle C in which a backup device 1 for a vehicle (also referred to hereinafter simply as a backup device 1), which pertains to Embodiment 1, is mounted. Inside this vehicle C, an electronic control system 100 for a vehicle (also referred to hereinafter as a control system 100), which is capable of operating various electronic components inside the vehicle through electrical control, is provided. The backup device 1 is configured as a part of this control system 100.

The control system 100 illustrated in FIG. 1 is configured as a system including a power supply system 110 for a vehicle (also referred to hereinafter as a power supply system 110), which includes the backup device 1, and various targets (an electric parking brake 121 illustrated in FIG. 4, and an electric power steering system, a shift-by-wire system, etc., which are not illustrated) to which power is supplied from this power supply system 110.

First, parts constituting the electronic control system 100 for a vehicle, which is illustrated in FIG. 1, will be described with a focus on the backup device 1.

The power supply system 110 includes a first power supply unit 91 that serves as the main power source for supplying power to the various targets described above, a second power supply unit 7 that serves as the power supply source at least when the power supply from the first power supply unit 91 enters an abnormal state, and the backup device 1, which has the function of causing the second power supply unit 7 to discharge at least when the power supply from the first power supply unit 91 enters the abnormal state. The power supply system 110 is configured as a system for supplying power by using the first power supply unit 91 or the second power supply unit 7 as the power supply source. Note that while the following describes a configuration in which the second power supply unit 7 is included as a part of the backup device 1 as a typical example, the second power supply unit 7 may also be provided outside the backup device 1.

In the power supply system 110, in a normal state in which the power supply from the first power supply unit 91 has not decreased, the output voltage of the first power supply unit 91 is applied to a wiring portion 81 serving as a power line, and power is supplied from the first power supply unit 91 to various electric components via the wiring portion 81. In the present configuration, the "normal state in which the power supply from the first power supply unit 91 has not decreased" is a state in which the output voltage of the first power supply unit 91 exceeds a predetermined value, and specifically, is a state in which the voltage of a first conduction path 21, which is detected by a control unit 5, exceeds a predetermined value. Conversely, an "abnormal state in which the power supply from the first power supply unit 91 has decreased or has been interrupted" is a state in which the output voltage of the first power supply unit 91 is less than or equal to the predetermined value, and specifically, is a state in which the voltage of the first conduction path 21, which is detected by the control unit 5, is less than or equal to the predetermined value.

The first power supply unit 91 is configured as a known car-mounted battery such as a lead battery, for example. The high potential-side terminal of the first power supply unit 91 is electrically connected to the wiring portion 81, and the first power supply unit 91 applies a predetermined output voltage (also referred to as hereinafter as a B+ voltage) to the wiring portion 81. Note that a generator that is not illustrated is also connected to the wiring portion 81.

Figure 2:
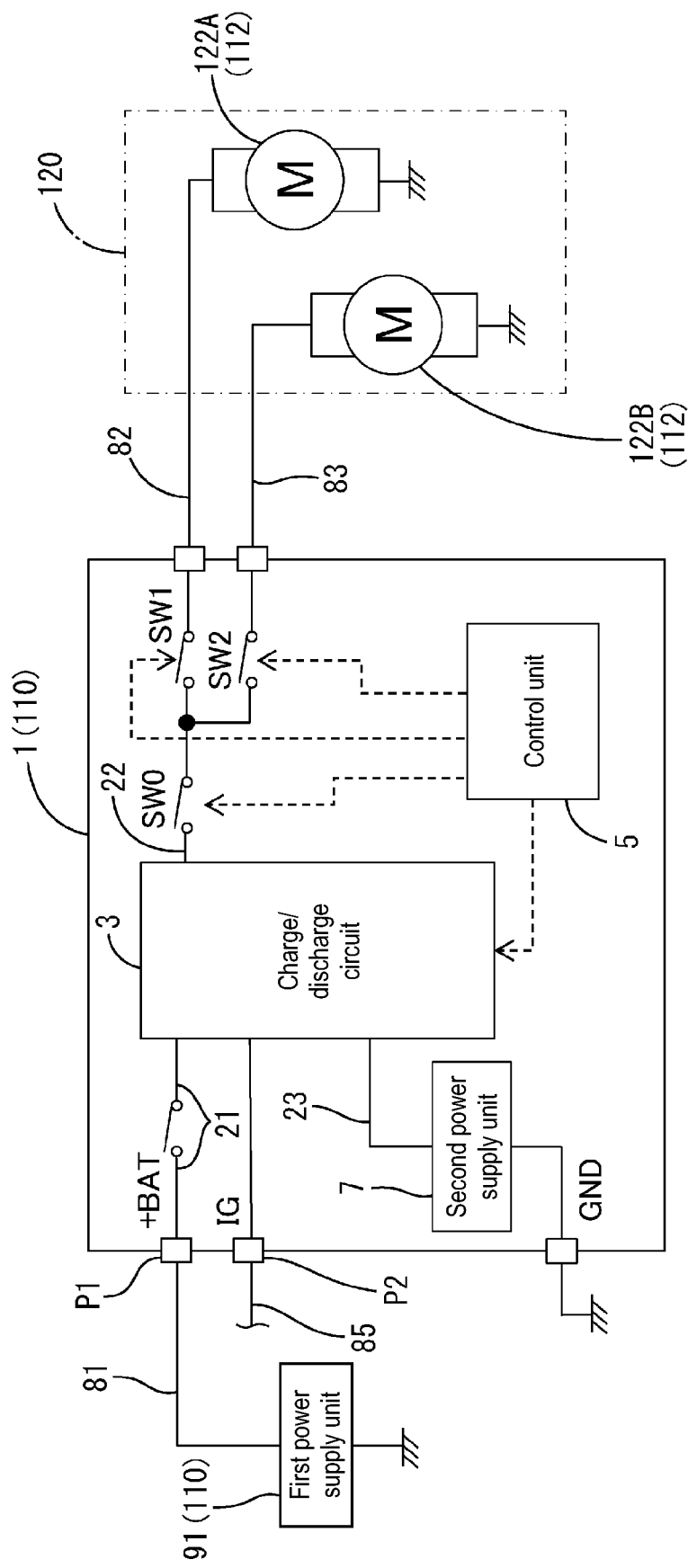
FIG. 2 is a block diagram schematically illustrating an example of an electronic control system for a vehicle, which includes the backup device for a vehicle, which pertains to Embodiment 1.

As illustrated in FIG. 2, the backup device 1 includes the second power supply unit 7, a charge/discharge circuit 3, the control unit 5, etc. The backup device 1 has the function of receiving power supply from the first power supply unit 91 and charging the second power supply unit 7, and has the function of energizing loads (the electric parking brake 121, etc.) based on the power from the first power supply unit 91 or the second power supply unit 7.

Figure 3:
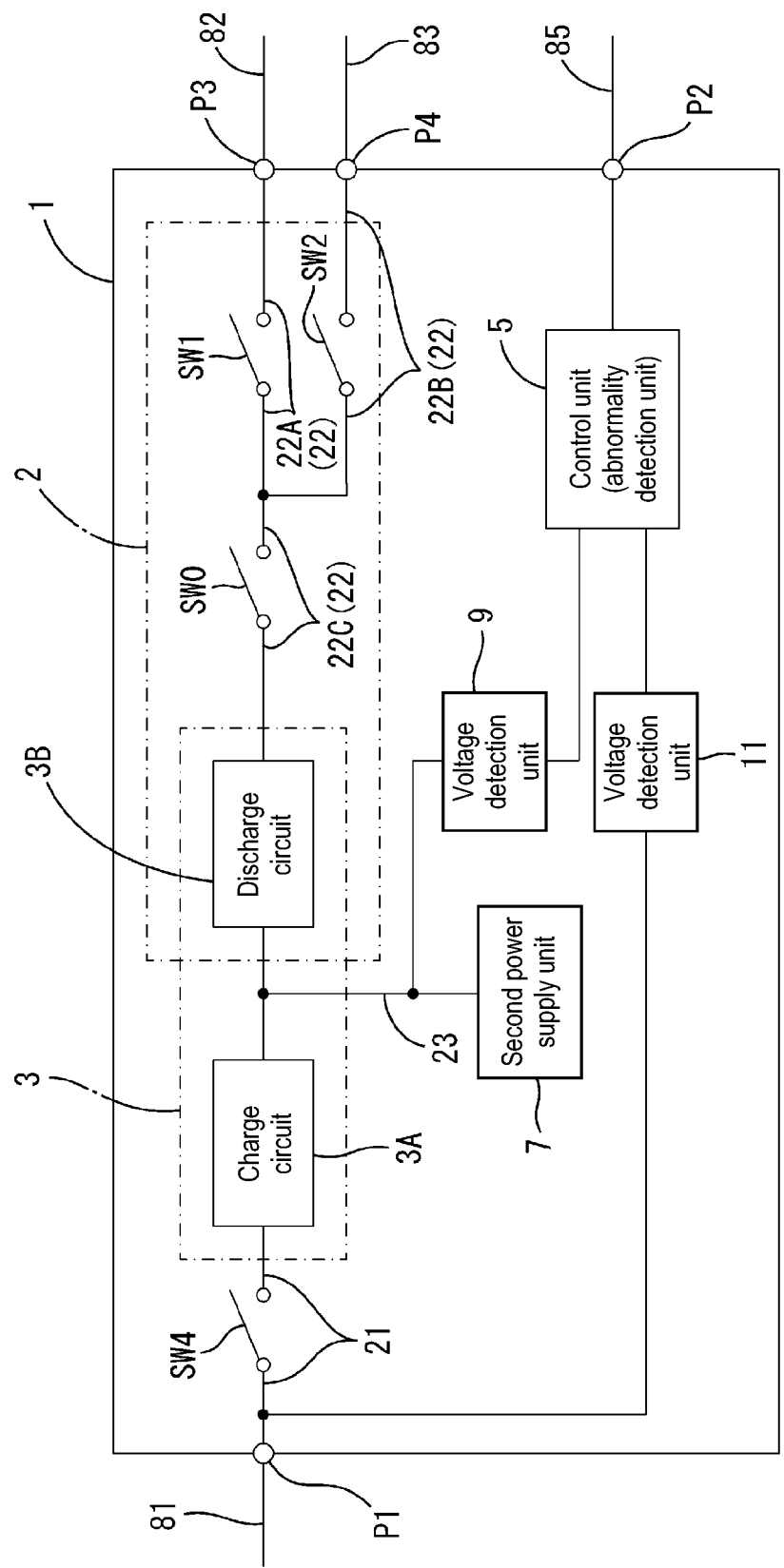
FIG. 3 is a block diagram schematically illustrating an example of an internal configuration of the backup device for a vehicle, which pertains to Embodiment 1.

As illustrated in FIGS. 2 and 3, the backup device 1 includes the first conduction path 21, which is electrically connected to the wiring portion 81 via a terminal P1, a second conduction path 22 that serves as a power supply path to wiring portions 82, 83, and a third conduction path 23 that is electrically connected to the high potential-side terminal of the second power supply unit 7.

As illustrated in FIG. 3, the first conduction path 21 is electrically connected to the high potential-side terminal of the first power supply unit 91 (FIG. 2) via the wiring portion 81, and forms a configuration with respect to which the output voltage from the first power supply unit 91 is applied. This first conduction path 21 serves as a path for supplying the power from the first power supply unit 91 to the charge/discharge circuit 3 when a switch SW4 is on. The switch SW4 is configured by a semiconductor switch such as a MOSFET, a mechanical relay, or the like, and power supply from the first power supply unit 91 to the charge/discharge circuit 3 is interrupted when the switch SW4 is off and is permitted when the switch SW4 is on.

The second conduction path 22 includes a common conduction path 22 that is an output-side path connected to the charge/discharge circuit 3, and branch paths 22A and 22B branching from the common conduction path 22C. As illustrated in FIG. 2, the branch path 22A is electrically connected to the wiring portion 82 (a conduction path configured as a path for applying a drive current to a motor 122A) via a terminal P4 provided to the backup device 1, and serves as a path for applying, to the wiring portion 82, an output current that is output from the charge/discharge circuit 3 to the common conduction path 22C when switches SW0, SW1 are both on. The branch path 22B is electrically connected to the wiring portion 83 (a conduction path configured as a path for applying a drive current to a motor 122B) via a terminal P3 provided to the backup device 1, and serves as a path for applying, to the wiring portion 83, the output current that is output from the charge/discharge circuit 3 to the common conduction path 22C when switches SW0, SW2 are both on.

The switches SW0, SW1, SW2 are each configured by a semiconductor switch such as a MOSFET, a mechanical relay, or the like. The switch SW0 is provided on the common conduction path 22C. When the switch SW0 is off, the switch SW0 puts the common conduction path 22C in an interruption state (a state of interrupting the flow of current from the charge/discharge circuit 3 to the branch paths 22A, 22B). When the switch SW0 is on, the switch SW0 puts the common conduction path 22C in an interruption-released state (a state of permitting the flow of current from the charge/discharge circuit 3 to the branch paths 22A, 22B). The switch SW1 is provided on the branch path 22A. When the switch SW1 is off, the switch SW1 puts the branch path 22A in an interruption state (a state of interrupting the flow of current from the common conduction path 22C to the wiring portion 82). When the switch SW1 is on, the switch SW1 puts the branch path 22A in an interruption-released state (a state of permitting the flow of current from the common conduction path 22C to the wiring portion 82). The switch SW2 is provided on the branch path 22B. When the switch SW2 is off, the switch SW2 puts the branch path 22B in an interruption state (a state of interrupting the flow of current from the common conduction path 22C to the wiring portion 83). When the switch SW2 is on, the switch SW2 puts the branch path 22B in an interruption-released state (a state of permitting the flow of current from the common conduction path 22C to the wiring portion 83).

The second power supply unit 7 is a power supply unit that supplies power at least when power supply from the first power supply unit 91 stops, and is constituted by a known power storage means such as an electric double-layer capacitor, for example. The second power supply unit 7 is electrically connected to the charge/discharge circuit 3, and is configured to be capable of being charged and discharged by the charge/discharge circuit 3. Specifically, the second power supply unit 7 is electrically connected to a charge circuit 3A and a discharge circuit 3B via the third conduction path 23, and is charged by the charge circuit 3A and discharged by the discharge circuit 3B. The second power supply unit 7 may be a power storage unit with an output voltage that, when fully charged, is lower than the output voltage of the first power supply unit 91 when fully charged, or may be a power storage unit with an output voltage that, when fully charged, is higher than the output voltage of the first power supply unit 91 when fully charged.

As illustrated in FIG. 3, the charge/discharge circuit 3 has the charge circuit 3A and the discharge circuit 3B, and is capable of performing a charge operation of charging the second power supply unit 7 based on the power supplied from the first power supply unit 91 and a discharge operation of causing the second power supply unit 7 to discharge.

The charge circuit 3A is configured as a known charge circuit such as a DC-DC converter, and performs the charge operation based on the power supply from the first power supply unit 91 and supplies a charge current to the second power supply unit 7 via the third conduction path 23. This charge circuit 3A performs a step-down or step-up operation by using the voltage applied to the first conduction path 21 by the first power supply unit 91 as an input voltage, and applies a desired output voltage to the third conduction path 23. The charge circuit 3A is configured to be capable of receiving a charge instruction signal and a charge stop signal from the control unit 5, and is configured to perform a charging operation of applying a predetermined voltage to the third conduction path 23 when the charge instruction signal has been provided from the control unit 5 (when a charge instruction has been provided) and to stop the output to the third conduction path 23 when the charge stop signal has been provided from the control unit 5 (when a charge stop instruction has been provided).

The discharge circuit 3B is configured to switch the state of the portion between the output path from the charge circuit 3A (the third conduction path 23) and the second conduction path 22 (specifically, the portion between the third conduction path 23 and the common conduction path 22C) between a conducting state and a non-conducting state. The discharge circuit 3B is configured as a known charge circuit such as a DC-DC converter, for example, performs a step-down or step-up operation using the voltage applied to the third conduction path 23 by the second power supply unit 7 as an input voltage, and applies a desired output voltage to the second conduction path 22 (specifically, the common conduction path 22C). The discharge circuit 3B is configured to be capable of receiving a discharge instruction signal and a discharge stop signal from the control unit 5, and when the discharge instruction signal has been provided from the control unit 5 (when a discharge instruction has been provided), performs the step-down or step-up operation, puts the portion between the third conduction path 23 and the second conduction path 22 in a conducting state, and performs discharge from the second power supply unit 7 to the loads (the motors 122A, 122B, etc.). Furthermore, when the discharge stop signal is being provided from the control unit 5 (when a discharge stop instruction is being provided), the discharge circuit 3B turns off and interrupts the conduction of the portion between the third conduction path 23 and the second conduction path 22, and stops the discharge from the second power supply unit 7 to the loads (the motors 122A, 122B, etc.).

In the present configuration, a discharge unit 2 is constituted by the discharge circuit 3B, the switches SW0, SW1, and SW2, and the second conduction path 22 (the common conduction path 22C and the branch paths 22A and 22B). This discharge unit 2 functions so as to perform a discharge operation of applying a discharge current to at least a plurality of predetermined drive sources (specifically, the motors 122A, 122B) based on power supplied from the second power supply unit 7.

A voltage detection unit 11 is configured as a known voltage detection circuit, and inputs, to the control unit 5, a value indicating the voltage of the first conduction path 21 in the form of an analog voltage signal. Note that the voltage detection unit 11 may be configured to input, to the control unit 5, the voltage value of the first conduction path 21 itself, or may for example be configured to input, to the control unit 5, a divided voltage value yielded by dividing the voltage of the first conduction path 21 by using a voltage dividing circuit. A voltage detection unit 9 is configured as a known voltage detection circuit, and inputs, to the control unit 5, a value indicating the voltage of the third conduction path 23 in the form of an analog voltage signal. Note that the voltage detection unit 9 may be configured to input, to the control unit 5, the voltage value of the third conduction path 23 itself, or may for example be configured to input, to the control unit 5, a divided voltage value yielded by dividing the voltage of the third conduction path 23 by using a voltage dividing circuit. The control unit 5 finds out the voltage value of the first conduction path 21 based on the analog voltage signal input thereto from the voltage detection unit 11, and finds out the voltage value of the third conduction path 23 based on the analog voltage signal input thereto from the voltage detection unit 9.

The control unit 5 is configured as a microcomputer, for example, and has a calculation device such as a CPU, a memory such as a ROM or a RAM, an AD converter, etc. This control unit 5 is capable of finding out the voltage value of the first conduction path 21 and the voltage value of the third conduction path 23. Furthermore, the control unit 5 has the function of controlling the charge operation and discharge operation by the charge/discharge circuit 3, and specifically has a function of providing the charge circuit 3A with the charge instruction signal or the charge stop signal and a function of providing the discharge circuit 3B with the discharge instruction signal or the discharge stop signal.

Furthermore, the control unit 5 is capable of individually controlling the operations for turning the switches SW0, SW1, and SW2 on and off. The switch SW0 turns on when the control unit 5 outputs an on signal to the switch SW0 and turns off when the control unit 5 outputs an off signal to the switch SW0. Similarly, the switch SW1 turns on when the control unit 5 outputs an on signal to the switch SW1 and turns off when the control unit 5 outputs an off signal to the switch SW1. Similarly, the switch SW2 turns on when the control unit 5 outputs an on signal to the switch SW2 and turns off when the control unit 5 outputs an off signal to the switch SW2.

A terminal P2 provided in the backup device 1 has a signal line 85 connected thereto. The signal line 85 is a transmission path on which an ignition ON signal (also referred to hereinafter as an IG ON signal) indicating that an ignition switch is on and an ignition OFF signal (also referred to hereinafter as an IG OFF signal) indicating that the ignition switch is off are transmitted, and the control unit 5 is capable of receiving the IG ON signal and the IG OFF signal via the signal line 85. Specifically, the IG ON signal is input to the control unit 5 via the signal line 85 when an ignition switch that is not illustrated and is provided in the vehicle in which the backup device 1 is mounted is turned on, and the IG OFF signal is input to the control unit 5 via the signal line 85 when the ignition switch is turned off.

Next, an electric parking brake (EPB) system 120, which is the backup target, will be described.

Figure 4:
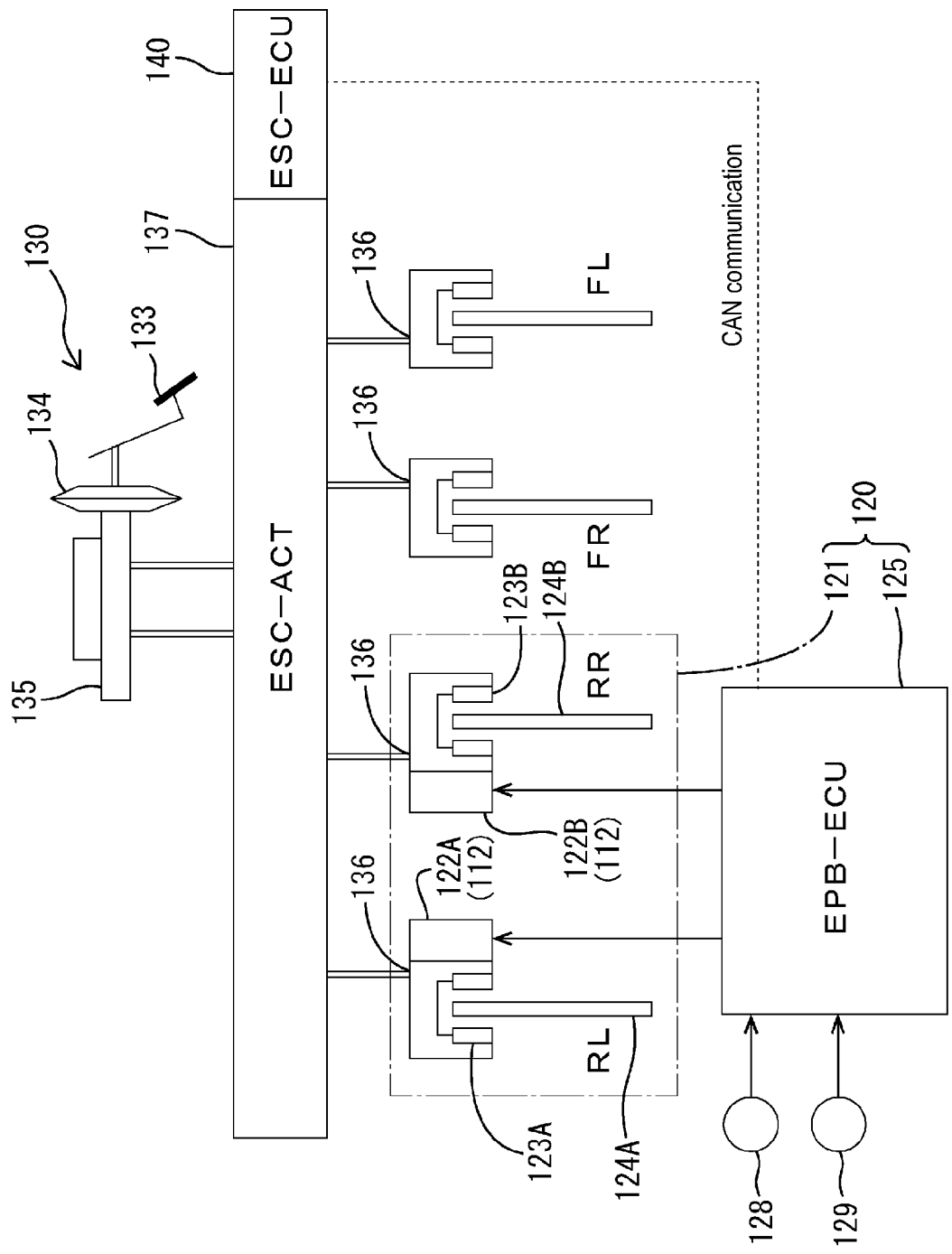
FIG. 4 is an explanatory diagram conceptually illustrating a brake system mounted in the vehicle illustrated in FIG. 1.

As illustrated in FIG. 4, a brake system of the vehicle C (FIG. 1) includes a service brake 130 that generates a braking force based on a stepping force applied by a driver, and an electric parking brake (EPB) 121 for locking the wheels and regulating the movement of the vehicle while the vehicle is parked.

Brake mechanisms provided for the respective wheels are mechanical structures that generate the braking force in the brake system illustrated in FIG. 4. The front wheel-system brake mechanisms are provided with structures for generating a braking force with respect to the wheels by pressing brake pads against brake disks as the driver operates the service brake 130. Note that the front wheel-system brake mechanisms, which generate the braking force when the service brake 130 is operated, are those that have been commonly and conventionally used. After the stepping force corresponding to the level by which the driver steps on the brake pedal 133 is boosted by a booster device 134, the service brake 130 generates a brake fluid pressure corresponding to the boosted stepping force inside a master cylinder 135, and generates the braking force by transmitting this brake fluid pressure to wheel cylinders 136 included in the brake mechanisms of the respective wheels. Furthermore, an actuator 137 for adjusting the brake fluid pressure is provided between the master cylinder 135 and the wheel cylinders 136, and a structure is provided such that various types of control (for example, ABS control, etc.) for adjusting the braking force generated by the service brake 130 and improving the safety of the vehicle can be performed. Various types of control using the actuator 137 are executed by an electronic stability control (ESC)-ECU 140.

Rear wheel-system brake mechanisms are provided with shared structures for generating a braking force in response to both the operation of the service brake 130 and the operation of the electric parking brake 121, and are provided with structures for generating a braking force with respect to the wheels by pressing brake pads 123A, 123B against brake disks 124A, 124B when the electric parking brake 121 is operated, in addition to structures for generating a braking force in accordance with the operation of the service brake 130 by the driver. Mechanically known structures can be adopted also for the rear wheel-system brake mechanisms.

The electric parking brake 121 is controlled by an EPB control device 125 (also referred to hereinafter as an EPB-ECU 125). The electric parking brake 121 drives the motors 122A, 122B based on control by the EPB-ECU 125 and controls the brake mechanisms to generate a braking force.

The electric parking brake 121 includes the two motors 122A, 122B (a plurality of drive sources) for respectively driving the brake pads 123A, 123B (friction members), which are provided in correspondence with wheels (specifically, both rear wheels of the vehicle C) at both sides of the vehicle C in a width direction. Furthermore, during positive rotation driving of the motor 122A in a predetermined positive direction, the brake pad 123A (the friction member) corresponding to the motor 122A moves toward and comes into contact with the brake disk 124A (a friction-receiving member) integrally provided on a wheel to generate a braking force of the rear wheel on which the brake disk 124A is provided (a rear wheel RL corresponding to tire R1 illustrated in FIG. 1). Furthermore, during reverse rotation driving of the motor 122A in a reverse direction opposite to the positive direction, the brake pad 123A corresponding to the motor 122A operates so as to move away from the brake disk 124A and release the braking force. Similarly, during positive rotation driving of the motor 122B in the predetermined positive direction, the brake pad 123B (the friction member) corresponding to the motor 122B moves toward and comes into contact with the brake disk 124B (a friction-receiving member) integrally provided on a wheel to generate a braking force of the rear wheel on which the brake disk 124B is provided (a rear wheel RR corresponding to tire R2 illustrated in FIG. 1). Furthermore, during reverse rotation driving of the motor 122B in the reverse direction opposite to the positive direction, the brake pad 123B corresponding to the motor 122B operates so as to move away from the brake disk 124B and release the braking force.

The EPB-ECU 125 is configured as an electronic control device that includes a known microcomputer including a CPU, a ROM, a RAM, an input/output port, etc., and controls the rotation of the motors 122A, 122B based on programs stored in the ROM, etc., and thereby performs parking brake control such as lock control and release control. The EPB-ECU 125 and the ESC-ECU 140 exchange information with one another via CAN communication, which is an in-vehicle LAN, etc., and the EPB-ECU 125 is capable of acquiring vehicle speed information, etc., handled by the ESC-ECU 140 upon execution of the parking brake control.

The EPB-ECU 125 receives as input, for example, a signal corresponding to an operation state of an operation switch 128 provided in an instrument panel inside the vehicle compartment, which is not illustrated, and a detection signal of a shift position sensor 129, and drives the motors 122A, 122B based on the operation state of the operation switch 128, the shift position of the vehicle, etc. Specifically, the EPB-ECU 125 has various functional parts for executing parking brake control, such as motor current detection for detecting currents (motor currents) applied to the motors 122A, 122B at the upstream side or downstream side of the motors 122A, 122B, target motor current calculation for calculating a target motor current (target current value) for when the lock control is to be terminated, determination of whether or not the motor currents have reached the target motor current, and control of the electric parking brake 121 based on the operation state of the operation switch 128. The control of the electric parking brake 121 is performed by causing the motors 122A, 122B to perform positive and reverse rotation and stopping the rotation of the motors 122A, 122B based on the state of the operation switch 128 and the motor currents by using this EPB-ECU 125.

Next, the operations of the backup device 1 will be described.

In the power supply system 110 illustrated in FIG. 1, when the power supply from the first power supply unit 91 is in a normal state, the output voltage of the first power supply unit 91 is applied to the wiring portion 81 serving as the power line, and power is supplied from the first power supply unit 91 to various electric components via the wiring portion 81. Here, "when the power supply from the first power supply unit 91 is in a normal state" refers to a state in which the output voltage applied to the wiring portion 81 exceeds the predetermined value. As illustrated in FIG. 3, the voltage detection unit 11 inputs, to the control unit 5, a value indicating the voltage applied to the wiring portion 81 (specifically, a value indicating the voltage of the first conduction path 21), and the control unit 5 determines whether or not the detection value input from the voltage detection unit 11 is smaller than a threshold value and thereby determines whether or not the voltage of the wiring portion 81 is smaller than the predetermined value. Note that the predetermined value is a value smaller than the output voltage of the first power supply unit 91 when fully charged and greater than zero, and for example, is set to a value slightly greater than 0 V. In the present configuration, the control unit 5 corresponds to one example of an abnormality detection unit and functions so as to detect the abnormal state in which the power supply from the first power supply unit 91 has entered a predetermined decreased state, and a case in which the detection value input from the voltage detection unit 11 to the control unit 5 is smaller than the threshold value corresponds to one example of "a case in which the power supply from the first power supply unit 91 has entered a predetermined decreased state".

If the abnormal state in which the power supply from the first power supply unit 91 has entered the predetermined decreased state is detected (that is, if it is detected that the detection value input from the voltage detection unit 11 to the control unit 5 has fallen below the threshold value), the control unit 5 performs a protection operation of turning off the switch SW4 and interrupting the conduction between the wiring portion 81 and the charge/discharge circuit 3, and furthermore, provides the charge circuit 3A with the charge stop signal and stops the charge operation if the charge operation is being performed by the charge circuit 3A. Furthermore, if the abnormal state is detected in such a manner, the control unit 5 provides the discharge circuit 3B with the discharge instruction signal and causes the second power supply unit 7 to discharge. Specifically, the control unit 5 causes the discharge circuit 3B to perform a step-down or step-up operation so that a predetermined output voltage is applied to the common conduction path 22C, and applies, to the common conduction path 22C, an output current obtained based on the power from the second power supply unit 7. Note that the control unit 5 may perform such a discharge operation immediately after detecting the abnormal state or at a predetermined timing. For example, if other devices for which backup is to be performed, such as the EPB-ECU 125 illustrated in FIG. 4 and other loads, are connected to the common conduction path 22C, power can be promptly supplied to such devices due to the control unit 5 causing the discharge circuit 3B to perform the discharge operation immediately after the abnormal state is detected.

Figure 5:
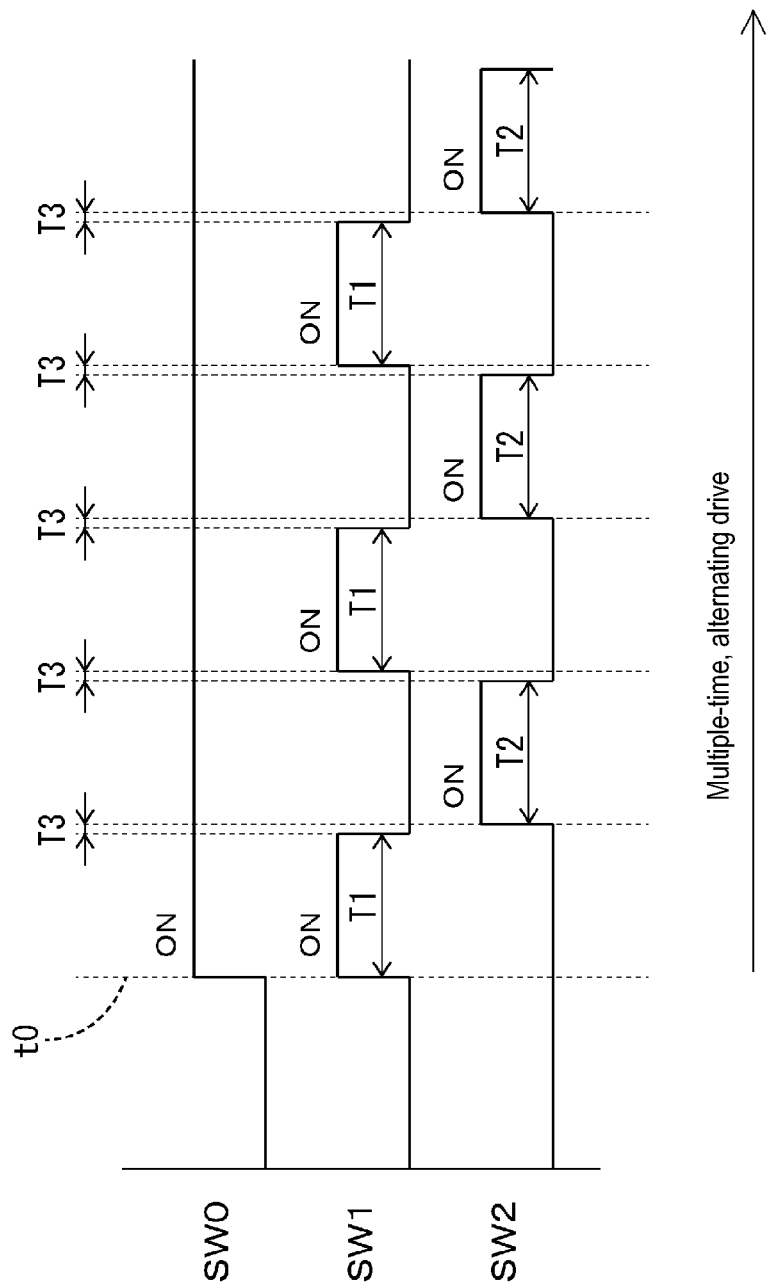
FIG. 5 is a timing chart illustrating an example of switching timings of switches SW0, SW1, and SW2 of a discharge unit in the backup device for a vehicle, which pertains to Embodiment 1.
Figure 6:
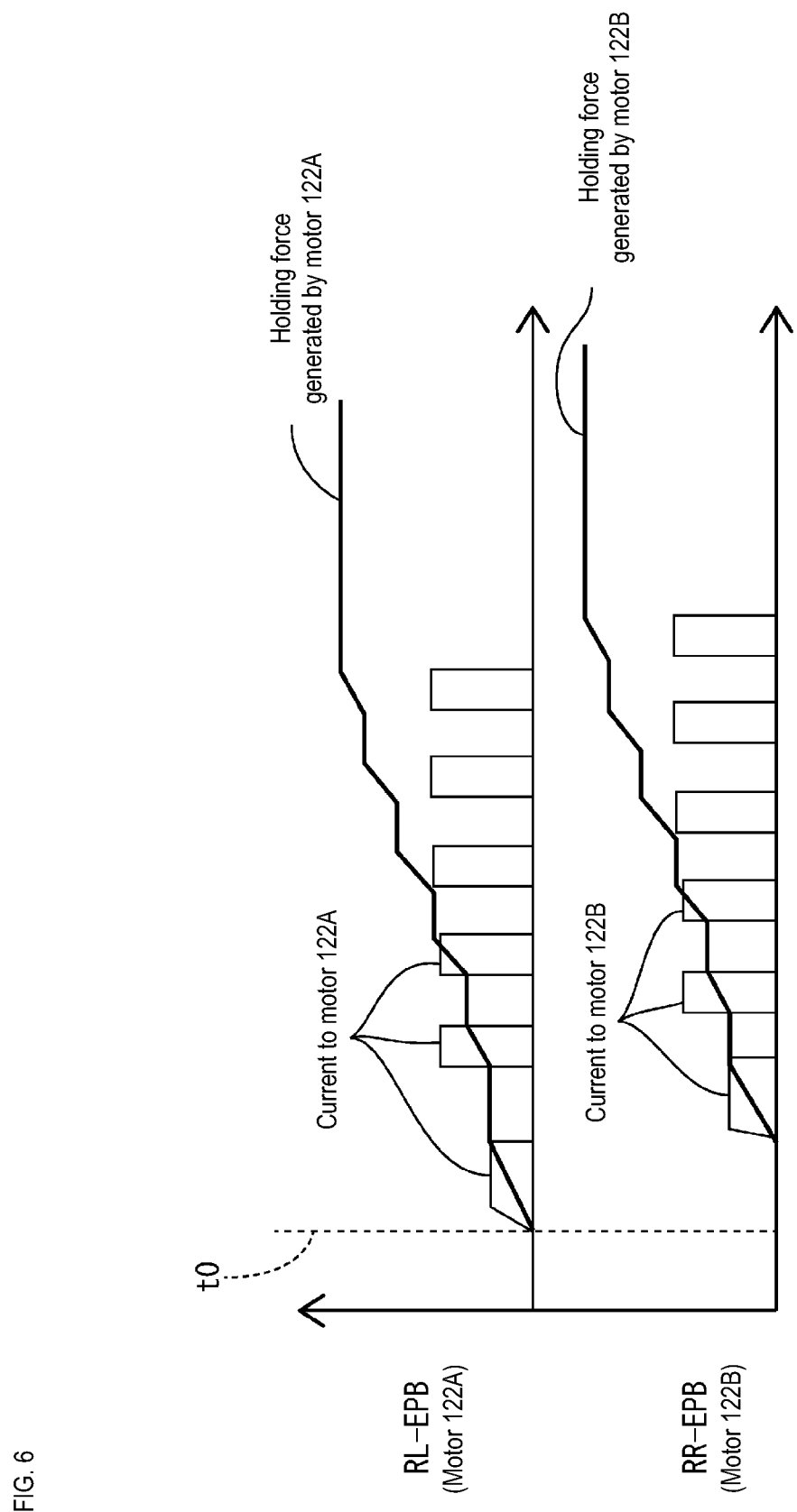
FIG. 6 includes an upper tier showing a graph illustrating a relationship between a current supplied to one motor and a holding force generated by the one motor, and a lower tier showing a graph illustrating a relationship between a current supplied to another motor and a holding force generated by the other motor.

Then, when a predetermined starting condition is satisfied in a case in which the control unit 5 has detected the abnormal state in such a manner, the control unit 5 starts current supply to the motors 122A, 122B. Specifically, if a predetermined operation is performed (for example, if the operation switch 128 is operated) after the detection value input from the voltage detection unit 11 to the control unit 5 has become smaller than the threshold value, the control unit 5 instructs the discharge unit 2 to intermittently apply the discharge current a plurality of times to each of the two motors 122A, 122B, and as illustrated in FIG. 5, controls the supply destination of the discharge current such that the instruction time periods T1 during which the discharge unit 2 is instructed to apply the discharge current to one motor 122A are shifted with respect to the instruction time periods T2 during which the discharge unit 2 is instructed to apply the discharge current to the other motor 122B. In FIGS. 5 and 6, time t0 is the timing at which the predetermined operation is performed (for example, the timing at which the operation switch 128 is operated), and after this timing, the control unit 5 alternately repeats instruction time periods T1, during which the switches SW0, SW1 are both turned on and the switch SW2 is turned off, and instruction time periods T2, during which the switches SW0, SW2 are both turned on and the switch SW1 is turned off. Note that during the instruction time periods T1, because the switches SW0, SW1 are both on and the switch SW2 is off, the discharge current from the discharge circuit 3B is applied to only the motor 122A, among the two motors 122A, 122B. Furthermore, during the instruction time periods T2, because the switches SW0, SW2 are both on and the switch SW1 is off, the discharge current from the discharge circuit 3B is applied to only the motor 122B, among the two motors 122A, 122B.

In such a manner, the control unit 5 controls the supply destination of the discharge current so that each instruction time period during which the discharge unit 2 is instructed to apply the discharge current to each of the two motors 122A, 122B does not overlap with each instruction time period during which the discharge unit 2 is instructed to apply the discharge current to another motor. That is, the control unit 5 controls the supply destination of the discharge current by controlling the ON periods of the switches SW0, SW1, SW2 so that each instruction time period T1 during which the discharge unit 2 is instructed to apply the discharge current to one motor 122A does not overlap with each instruction time period T2 during which the discharge unit 2 is instructed to apply the discharge current to the other motor 122B.

Furthermore, when the discharge current is applied intermittently in such a manner, a stop time period T3 during which the discharge unit 2 is instructed not to apply the discharge current to any motor is set between each instruction time period during which the discharge unit 2 is instructed to apply the discharge current to each of the two motors 122A, 122B and each instruction time period during which the discharge unit 2 is subsequently instructed to apply the discharge current to another motor. For example, after each instruction time period T1 during which the discharge unit 2 is instructed to apply the discharge current to one motor 122A, each instruction time period T2 during which the discharge unit 2 is subsequently instructed to apply the discharge current to the other motor 122B will be set, and a stop time period T3 will be set between the end timing of an instruction time period T1 and the start timing of the subsequent instruction time period T2. Furthermore, after each instruction time period T2 during which the discharge unit 2 is instructed to apply the discharge current to the other motor 122B, each instruction time period T1 during which the discharge unit 2 is subsequently instructed to apply the discharge current to one motor 122A will be set, and a stop time period T3 will be set between the end timing of an instruction time period T2 and the start timing of the subsequent instruction time period T1. During the stop time periods T3, the switches SW1, SW2 are both switched off, and thus, no current is applied to either one of the two motors 122A, 122B. In such a manner, a concurrent overlap of discharge currents in the two motors 122A, 122B is moderated and the peak level is suppressed.

When such an operation is performed, motor rotation progresses in each of the two motors 122A, 122B each time the discharge current is applied, and thus, the holding force (frictional force) generated by the brake pads 123A and 123B increases each time the discharge current is applied. Specifically, as illustrated in FIG. 6, the rotation of the motor 122A progresses each time the discharge current is applied to the motor 122A, and thus, the holding force generated by the motor 122A (that is, frictional force generated by the brake pad 123A) increases in a stepwise manner each time the discharge current is applied. Furthermore, the rotation of the motor 122B progresses each time the discharge current is applied to the motor 122B, and thus, the holding force generated by the motor 122B (that is, frictional force generated the brake pad 123B) increases in a stepwise manner each time the discharge current is applied. Furthermore, the holding forces of the two motors 122A, 122B increase alternatingly as illustrated in FIG. 6, and thus a bias in the increase degrees of the holding forces can be suppressed. Note that in FIG. 6, a graph indicating the relationship between the timings of current supply to the motor 122A and the holding force generated by the motor 122A is shown in the upper tier, and a graph indicating the relationship between the timings of current supply to the motor 122B and the holding force generated by the motor 122B is shown in the lower tier. In each graph, the magnitude of the holding force is indicated by a thick line and the current supplied to the motor is indicated by relatively thin lines.

Next, examples of effects of the present configuration will be described.

In the backup device 1 of the present configuration, when a predetermined starting condition is satisfied in a case in which the control unit 5 corresponding to the abnormality detection unit has detected the abnormal state, the control unit 5 provides an instruction (an instruction to intermittently apply the discharge current a plurality of times to each of the plurality of drive sources (the motors 122A, 122B)) to the discharge unit. Due to this, it is possible to cause the second power supply unit 7 to discharge and apply the discharge current to the plurality of predetermined drives sources by using the discharge unit 2. Furthermore, the control unit 5 controls a supply destination of the discharge current such that each instruction time period during which the discharge unit 2 is instructed to apply the discharge current to each of the drive sources is shifted with respect to each instruction time period during which the discharge unit 2 is instructed to apply the discharge current to another drive source. Due to this, the time periods during which the discharge current flows intermittently in each of the plurality of drive sources will be shifted from the time periods during which the discharge current flows intermittently in another drive source. Accordingly, the concurrent concentration of discharge currents in the plurality of drive sources can be moderated and the peak level of the current output from the second power supply unit 7 can be suppressed.

Hence, the backup device 1 is capable of performing backup of a plurality of drive sources based on the power supply from the second power supply unit 7 even when the power supply from the first power supply unit 91 decreases (for example, a case in which the power supply from the first power supply unit 91 completely stops, etc.), and is capable of effectively reducing the peak voltage necessary in the backup operation. Due to this, it is easier to reduce the scale of the second power supply unit 7, and the size and cost of the second power supply unit 7 can be reduced.

Specifically, in the backup device 1, the supply destination of the discharge current is controlled such that each instruction time period during which the discharge unit 2 is instructed to apply the discharge current to each of the drive sources does not overlap with each instruction time period during which the discharge unit 2 is instructed to apply the discharge current to another drive source, whereby the concurrent concentration of discharge currents in the plurality of drive sources can be suppressed more reliably and the peak current that is needed for the backup operation can be reduced more effectively.

Furthermore, in the backup device 1, a stop time period during which the discharge unit 2 is instructed not to apply the discharge current to any drive source is set between each instruction time period during which the discharge unit 2 is instructed to apply the discharge current to each of the drive sources and each instruction time period during which the discharge unit 2 is subsequently instructed to apply the discharge current to another drive source, whereby a situation in which discharge currents based on the power supply from the second power supply unit 7 flow concurrently in the plurality of predetermined drive sources can be suppressed or prevented more reliably.

The backup target of the backup device 1 of the present configuration is the electric parking brake 121. The electric parking brake 121 includes, as a plurality of drive sources, two motors 122A, 122B for respectively driving the brake pads 123A, 123B (friction members), which are disposed to correspond to wheels (specifically, both rear wheels) at both sides of the vehicle C in a width direction. Furthermore, during positive rotation driving of one motor 122A in a predetermined positive direction, the brake pad 123A (the friction member) corresponding to the motor 122A moves toward and comes into contact with the brake disk 124A (a friction-receiving member) integrally provided on a wheel to generate a braking force, and during reverse rotation driving of the motor 122A in a reverse direction opposite to the positive direction, the brake pad 123A corresponding to the motor 122A operates so as to move away from the brake disk 124A and release the braking force. Similarly, during positive rotation driving of the other motor 122B in the predetermined positive direction, the brake pad 123B (the friction member) corresponding to the motor 122B moves toward and contacts the brake disk 124B (a friction-receiving member) integrally provided on a wheel to generate a braking force, and during reverse rotation driving of the motor 122B in the reverse direction opposite to the positive direction, the brake pad 123B corresponding to the motor 122B operates so as to move away from the brake disk 124B and release the braking force. Furthermore, when a predetermined starting condition is satisfied in a case in which the abnormality detection unit has detected the abnormal state, the control unit 5 instructs the discharge unit 2 to intermittently apply the discharge current a plurality of times to each of the two motors 122A, 122B and controls a supply destination of the discharge current such that each instruction time period during which the discharge unit 2 is instructed to apply the discharge current to one motor 122A is shifted with respect to each instruction time period during which the discharge unit 2 is instructed to apply the discharge current to the other motor 122B.

In the above-described backup device 1, if the power supply from the first power supply unit 91 enters the abnormal state, the control unit 5 provides an instruction (an instruction to intermittently apply the discharge current a plurality of times to each of the two motors 122A, 122B) to the discharge unit 2. Due to this, it is possible to cause the second power supply unit 7 to discharge and cause the two motors 122A, 122B to operate by using the discharge unit 2, whereby the electric parking brake 121 can be driven. Furthermore, the control unit 5 controls a supply destination of the discharge current such that each instruction time period during which the discharge unit 2 is instructed to apply the discharge current to one motor 122A is shifted with respect to each instruction time period during which the discharge unit 2 is instructed to apply the discharge current to the motor 122B. Due to this, the time periods during which the discharge current flows intermittently in one motor 122A will be shifted from the time periods during which the discharge current flows intermittently in the other motor 122B. Accordingly, the concurrent concentration of discharge currents in the two motors 122A, 122B can be moderated and the peak level of the current output from the second power supply unit 7 can be suppressed. Furthermore, rather than causing the motor 122B at one side to operate after the operation of the motor 122A on the other side is completed, the discharge current will be supplied intermittently to both motors 122A, 122B over a certain period. Due to this, a bias in the drive timings of the two motors 122A, 122B can be suppressed.

Other Embodiments

The present disclosure is not limited to the embodiment described in the above description and the drawings, and the following embodiments, for example, are included within the technical scope of the present disclosure.

In Embodiment 1, a second power supply unit 7 configured as an electric double-layer capacitor is described as one example of the second power supply unit 7. However, in Embodiment 1 or any configuration yielded by making changes from Embodiment 1, the second power supply unit 7 may be a different power storage means such as, for example, a lithium ion battery or a lithium ion capacitor.

In Embodiment 1, a DC-DC converter is described as one example of the charge circuit 3A. In Embodiment 1 or any configuration yielded by making changes from Embodiment 1, the DC-DC converter can be configured as a boost converter, a buck converter, a buck-boost converter, or the like. Furthermore, the charge circuit 3A may be a known charge circuit other than a DC-DC converter.

In Embodiment 1, a DC-DC converter is described as one example of the discharge circuit 3B. In Embodiment 1 or any configuration yielded by making changes from Embodiment 1, the DC-DC converter can be configured as a boost converter, a buck converter, a buck-boost converter, or the like. Furthermore, the discharge circuit 3B may be a known discharge circuit other than a DC-DC converter.

In Embodiment 1, an example is described in which the control unit 5 is configured as a microcomputer. However, in Embodiment 1 or any configuration yielded by making changes from Embodiment 1, the control unit 5 may be configured by using a hardware circuit other than a microcomputer.

In Embodiment 1, an example is described in which the second power supply unit 7 performs power supply when power supply from the first power supply unit 91 has entered the decreased state. However, in Embodiment 1 or any configuration yielded by making changes from Embodiment 1, the second power supply unit 7 may perform power supply during some period during which power supply has not completely stopped, as long as the second power supply unit 7 is capable of performing power supply at least when power supply from the first power supply unit 91 has entered the decreased state. For example, a configuration may be used in which, during an excess voltage state in which the voltage of the first conduction path 21 exceeds a predetermined excess voltage threshold value or during an excess current state in which the current of the first conduction path 21 exceeds an excess current threshold, power supply from the first power supply unit 91 to the backup device 1 and the loads is interrupted, and in accordance with this, the backup operation (a backup operation similar to that in Embodiment 1) by the second power supply unit 7 is performed and the above-described current supply control to the motors 122A, 122B is performed when the predetermined starting condition is satisfied.

In Embodiment 1, a configuration in which the discharge unit 2 can apply the discharge current to a plurality of predetermined drive sources (the motors 122A, 122B in the example in FIG. 1) is described as an example. However, in Embodiment 1 or any configuration yielded by making changes from Embodiment 1, power from the second power supply unit 7 may be supplied to loads (for example, the shift-by-wire system, the electric power steering system, etc.) other than the plurality of drive sources during the backup operation.

In Embodiment 1, an example is described in which, during the backup operation, a current is intermittently applied to two drive sources (the two motors 122A, 122B) and the periods during which the current is applied are shifted with respect to one another. However, in Embodiment 1 or any configuration yielded by making changes from Embodiment 1, a current may be intermittently applied to three or more drive sources and the periods during which the current is applied may be shifted with respect to one another. Furthermore, the drive sources are not limited to motors of an electric parking brake and may be actuators other than motors, and the target may be a plurality of drive sources of different types.

In Embodiment 1, the control unit 5 functions as one example of an abnormality detection unit. However, in Embodiment 1 or any configuration yielded by making changes from Embodiment 1, an abnormality detection unit for detects an abnormality of the power supply from the first power supply unit 91 (for example, a detection circuit for detecting that the voltage of the first conduction path 21 has become lower than or equal to a threshold voltage, or the like) may be provided separately from the control unit 5.

In Embodiment 1, an example is described in which the control unit 5 corresponding to one example of the abnormality detection unit detects an abnormality of the voltage of the first conduction path 21, which is electrically connected to the first power supply unit 91. However, in Embodiment 1 or any configuration yielded by making changes from Embodiment 1, the abnormality detection unit may be configured to detect an abnormality of the current (for example, an abnormality such as a low current state in which the current value becomes lower than or equal to a threshold value, etc.) of the first conduction path 21, which is electrically connected to the first power supply unit 91.

In Embodiment 1, an example is described in which control is performed such that after the predetermined starting condition is satisfied, a period during which an energization instruction to one drive source is provided does not overlap with a period during which an energization instruction to another drive source is provided. However, in Embodiment 1 or any configuration yielded by making changes from Embodiment 1, the energization periods may partially overlap as long as the energization periods are shifted with respect to one another.

In Embodiment 1, "when the operation switch 128 is operated by a user" is described as an example of when the predetermined starting condition is satisfied. However, a starting condition other than this may be set. For example, the situation in which the vehicle speed becomes less than or equal to a predetermined value (for example, when the vehicle speed falls to zero, or the like) in a case in which the power supply from the first power supply unit 91 has entered the decreased state may be set as "when a predetermined starting condition is satisfied".

The invention claimed is:

1. A backup device for a vehicle, the backup device controlling a second power supply unit in a power supply system for a vehicle, the power supply system including a first power supply unit and the second power supply unit, which supplies power at least when power supply from the first power supply unit stops, the backup device comprising:

a discharge circuit for performing a discharge operation of applying a discharge current at least to a plurality of predetermined drive sources based on the power supplied from the second power supply unit;

an abnormality detection unit for detecting an abnormal state in which the power supply from the first power supply unit has entered a predetermined decreased state; and a control unit for, when a predetermined starting condition is satisfied in a case in which the abnormality detection unit has detected the abnormal state, instructing the discharge circuit to intermittently apply the discharge current a plurality of times to each of the plurality of drive sources, and controlling a supply destination of the discharge current such that each instruction time period during which the discharge circuit is instructed to apply the discharge current to each of the drive sources is shifted and does not overlap with each instruction time period with respect to each instruction time period during which the discharge circuit is instructed to apply the discharge current to another drive source, the control unit further configured to set a stop time period during which the discharge circuit is instructed not to apply the discharge current to any drive source between each instruction time period during which the discharge circuit is instructed to apply the discharge current to each of the plurality of drive sources and each instruction time period during which the discharge circuit is subsequently instructed to apply the discharge current to another drive source; and wherein backup is performed for an electric parking brake that includes, as the plurality of drive sources, two motors for respectively driving friction members that are provided in correspondence with wheels at both sides of the vehicle in a width direction and operates such that, during positive rotation driving of the motors in a predetermined positive direction, the friction members corresponding to the motors move toward and come into contact with friction-receiving members integrally provided on the wheels to generate a braking force, and during reverse rotation driving of the motors in a reverse direction opposite to the positive direction, the friction members corresponding to the motors move away from the friction-receiving members to release the braking force, and when the predetermined starting condition is satisfied in a case in which the abnormality detection unit has detected the abnormal state, the control unit instructs the discharge circuit to intermittently apply the discharge current a plurality of times to each of the two motors and controls a supply destination of the discharge current such that each instruction time period during which the discharge circuit is instructed to apply the discharge current to one of the motors is shifted with respect to each instruction time period during which the discharge circuit is instructed to apply the discharge current to the other one of the motors.

* * * * *